Patented Mar. 1, 1938

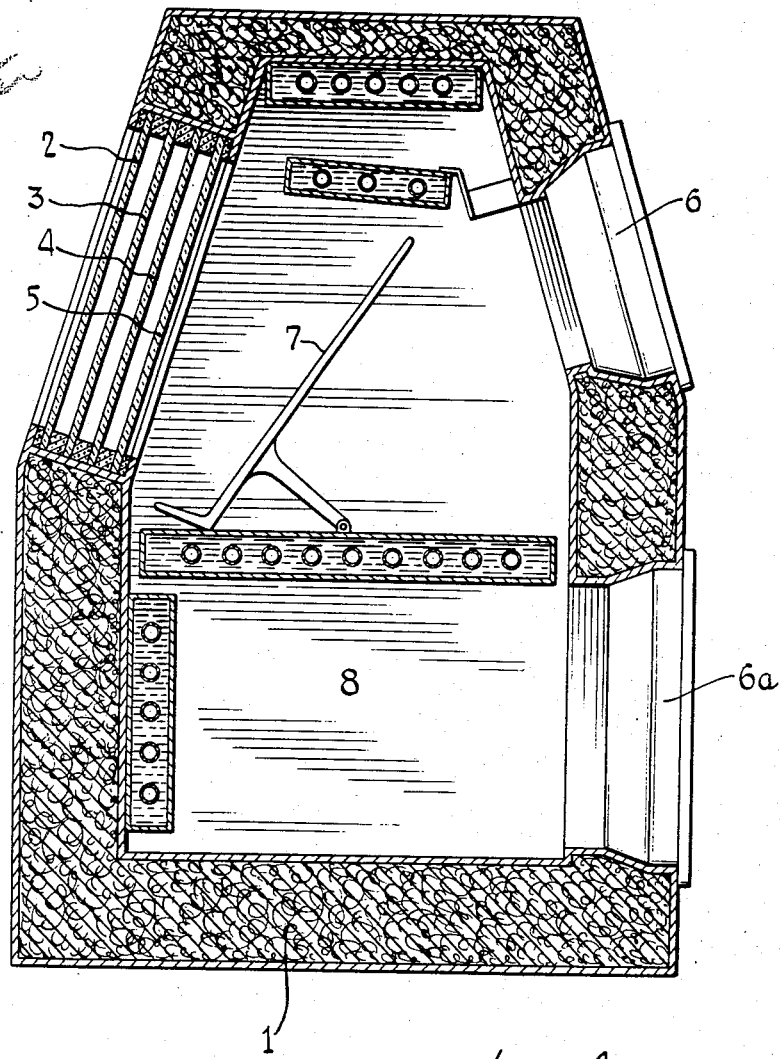

2,109,737

UNITED STATES PATENT OFFICE 2,109,737

SHOW WINDOW

Peter Schlumbohm, Paris, France

Application May 22, 1935, Serial No. 22,799
In Great Britain May 22, 1934

1 Claim. (Cl. 88—1)

This invention relates to glass windows for refrigerators and has for its object an improved window whereby the objects displayed in the refrigerator appear in their natural colours, especially in their natural red colour.

In refrigerators intended to display the objects they contain, the window through which the objects are viewed consists of a plurality of sheets of glass separated by air spaces. Generally three or four sheets are employed. This construction is required in order to avoid condensation of moisture on the glass.

Sheet or plate glass, obtainable commercially always has a light green tint which, in the case of a single sheet, is generally inappreciable. When, however, an object is viewed through a plurality of such sheets, and more especially when the light illuminating the objects also passes through the sheets, the green tint becomes appreciable and the objects do not appear in their natural colour. In the case, for instance, of meat displayed in such a refrigerator, the colour it appears to have in consequence of the green tint of the glass is objectionable.

According to the invention, a window for refrigerators is composed of a plurality of glass sheets of which two or more are of ordinary glass, while at least one sheet is of a reddish tint adapted to annul the greenish tint due to the ordinary glass. The reddish tint required to annul the greenish tint is so slight that the window appears to be composed of colourless glass.

A window according to the invention costs little more than one of ordinary glass, whereas a window composed of colourless glass is difficult to obtain and is costly.

The accompanying drawing is a vertical section of a refrigerating chamber adapted to display an object placed on the support 7. The insulated walls 1 of the chamber have two openings closed by access doors 6 and 6a and one opening closed by the four glass plates 2, 3, 4 and 5. Of these glass plates, three are of ordinary commercial glass, having the usual green tint, while one has a reddish tint of at least sufficient depth to annul the effect of the green tint on the appearance of the object displayed.

The invention is not restricted to the use of a single glass plate of reddish tint, since it may be desirable in certain cases to use two such plates, in order to make the use of tinted glass available commercially, but ordinarily, for the sake of economy, only one single reddish tinted glass will be employed. As the making of glass of reddish tint is well known to those who are acquainted with the art of glass making, I do not deem it to be necessary to go into the details of how to make such glass.

The invention is not restricted to refrigerator windows, but may be generally applied for multiple windows, especially for show windows, to correct the colour changing effect of the greenish tint of glass.

Having now particularly described and ascertained the nature of my said invention and in what manner the same is to be performed, I declare that what I claim is:

A show window as part of the heat insulating walls of a refrigerator display casing for foodstuffs with appetizing red meat colors comprising a plurality of sheets of glass of a slightly greenish tint as usual for commercial sheet glass and a filter of reddish tint arranged in functional relation to said sheets of glass of greenish tint to counteract by said reddish filter the disturbing optical color effect of said greenish tint on said appetizing red meat colors as appearing to a person viewing said foodstuffs through said plurality of sheets of glass, thus restoring and emphasizing said appetizing red meat colors by said reddish filter.

PETER SCHLUMBOHM.